(12) United States Patent
Hosoya et al.

(10) Patent No.: US 11,290,196 B2
(45) Date of Patent: Mar. 29, 2022

(54) MOBILE TERMINAL TESTING DEVICE, MOBILE TERMINAL TESTING SYSTEM, AND TESTING METHOD OF NSA

(71) Applicant: ANRITSU CORPORATION, Kanagawa (JP)

(72) Inventors: Takahiro Hosoya, Kanagawa (JP); Toyohiro Kayanuma, Kanagawa (JP); Daiki Kano, Kanagawa (JP); Toru Yamasaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/680,628

(22) Filed: Nov. 12, 2019

(65) Prior Publication Data

US 2020/0169335 A1    May 28, 2020

(30) Foreign Application Priority Data

Nov. 22, 2018    (JP) .............................. JP2018-219107

(51) Int. Cl.
| | | |
|---|---|---|
| *H04W 24/06* | (2009.01) | |
| *H04B 17/15* | (2015.01) | |
| *H04B 17/29* | (2015.01) | |
| *H04B 17/00* | (2015.01) | |
| *H04B 17/20* | (2015.01) | |
| *H04B 17/10* | (2015.01) | |
| *H04W 88/06* | (2009.01) | |

(52) U.S. Cl.
CPC ......... *H04B 17/0087* (2013.01); *H04B 17/10* (2015.01); *H04B 17/15* (2015.01); *H04B 17/20* (2015.01); *H04B 17/29* (2015.01); *H04W 24/06* (2013.01); *H04W 88/06* (2013.01)

(58) Field of Classification Search
CPC .............................................. H04B 17/00–409
See application file for complete search history.

(56) References Cited

U.S. PATENT DOCUMENTS

| | | | | |
|---|---|---|---|---|
| 10,524,144 | B2 * | 12/2019 | Ogawa | .................. H04W 24/06 |
| 2011/0306306 | A1 * | 12/2011 | Reed | ..................... H04W 24/06 |
| | | | | 455/67.11 |
| 2012/0100813 | A1 * | 4/2012 | Mow | .................. H04B 17/3911 |
| | | | | 455/67.12 |
| 2012/0327796 | A1 * | 12/2012 | Ozaki | ................... H04W 24/06 |
| | | | | 370/252 |

(Continued)

FOREIGN PATENT DOCUMENTS

| | | | |
|---|---|---|---|
| JP | 2014082708 A | * | 5/2014 |
| WO | 2017-062244 A1 | | 4/2017 |

*Primary Examiner* — Gennadiy Tsvey
(74) *Attorney, Agent, or Firm* — Pearne & Gordon LLP

(57) ABSTRACT

There is provided mobile terminal testing device and system capable of reducing a processing load, when testing mobile terminals that support NSA. Included are a first mobile terminal testing device operating as a base station of LTE and a second mobile terminal testing device operating as a base station of 5G NR of NSA, when testing a mobile terminal which supports NSA, the second mobile terminal testing device generates a control signal of 5G NR, transmits the generated control signal of 5G NR to the first mobile terminal testing device, and the first mobile terminal testing device 1 transmits the received control signal of 5G NR to the mobile terminal according to the LTE.

3 Claims, 2 Drawing Sheets

(56) References Cited

U.S. PATENT DOCUMENTS

| | | | | |
|---|---|---|---|---|
| 2013/0005384 A1* | 1/2013 | Tanaka | ............. | H04M 1/24 |
| | | | | 455/517 |
| 2014/0128003 A1* | 5/2014 | Takahashi | ............. | H04B 17/10 |
| | | | | 455/67.7 |
| 2014/0206345 A1* | 7/2014 | Tanaka | ............. | H04B 17/391 |
| | | | | 455/425 |
| 2014/0323059 A1* | 10/2014 | Wakasa | ............. | H04B 17/23 |
| | | | | 455/67.14 |
| 2015/0281984 A1* | 10/2015 | Takizawa | ............. | H04B 17/3912 |
| | | | | 455/67.14 |
| 2016/0219449 A1* | 7/2016 | Tanaka | ............. | H04W 24/08 |
| 2016/0286422 A1* | 9/2016 | Samejima | ............. | H04W 52/243 |
| 2017/0251460 A1* | 8/2017 | Agiwal | ............. | H04W 72/0406 |
| 2018/0343575 A1* | 11/2018 | Ogawa | ............. | H04W 24/06 |
| 2019/0053160 A1* | 2/2019 | He | ............. | H04W 76/27 |

\* cited by examiner

MOBILE TERMINAL TESTING DEVICE, MOBILE TERMINAL TESTING SYSTEM, AND TESTING METHOD OF NSA

TECHNICAL FIELD

The present invention relates to a mobile terminal testing device which tests a mobile terminal.

BACKGROUND ART

In a case of developing the mobile terminal performing communication while moving a mobile phone or a data communication terminal, it is necessary to test whether or not the developed mobile terminal can normally perform communication. Therefore, a testing device which operates as a pseudo base station simulating a function of an actual base station is connected to a mobile terminal to be tested, communication is performed between the testing device and the mobile terminal, and a test of checking the contents of the communication is performed.

In the mobile communication system, the standard specification of 5G NR (New Radio), which is a 5th Generation (5G) radio system, has been completed.

In 5G NR, 5G lines are specialized for User plane (U-Plane): User data signal. For Control Plane (C-Plane): communication control signal, the specifications of Non-Standalone (NSA) that transmits and receives signals using a Long Term Evolution (LTE) line, and Stand Alone (SA) that operates independently by 5G NR without linking with LTE are defined.

Patent Document 1 describes handover in NSA and SA communication systems.

RELATED ART DOCUMENT

Patent Document

[Patent Document 1] International Publication WO2017/062244

DISCLOSURE OF THE INVENTION

Problem that the Invention is to Solve

When testing a mobile terminal that supports NSA, it is possible to perform testing using a mobile terminal testing device that supports LTE testing and a mobile terminal testing device that supports 5G NR testing.

However, in such a configuration, each device generates a control signal corresponding to each communication method. Therefore, according to the NSA specification, a control signal of 5G NR is to be transmitted to an LTE mobile terminal testing device, so there is a problem in the method.

That is, when a control signal of 5G NR is generated by the LTE mobile terminal testing device, the LTE mobile terminal testing device is to generate a control signal based on the setting information of 5G NR, so processing load increases.

Therefore, an object of the present invention is to provide a mobile terminal testing device capable of reducing a processing load when testing a mobile terminal that supports NSA.

Means for Solving the Problem

A mobile terminal testing device of a first aspect of the present invention is a second mobile terminal testing device, out of two mobile terminal testing devices constituting a mobile terminal testing system which tests a mobile terminal and simulating base stations of mobile communication to test the mobile terminal, when a control signal of a communication standard not supported by the second mobile terminal testing device is transmitted to the mobile terminal by a first mobile terminal test device which constitutes the mobile terminal testing system and is different from the second mobile terminal test device, the second mobile terminal testing device generates the control signal and transmits the generated control signal to the first mobile terminal testing device.

With this configuration, when transmitting a control signal to the mobile terminal according to the communication standard (first communication standard) that a base station simulated by the second mobile terminal testing device does not support transmission, the control signal is generated by the second mobile terminal testing device, and the control signal is transmitted to the first mobile terminal testing device which simulates a base station that supports transmission in the first communication standard. Therefore, the processing load of the first mobile terminal testing device can be reduced.

A mobile terminal testing device of a second aspect of the present invention is a second mobile terminal testing device, out of two mobile terminal testing devices constituting a mobile terminal testing system which tests a mobile terminal and simulating base stations of mobile communication to test the mobile terminal, when a control signal of a communication standard not supported by the first mobile terminal testing device is received from a second mobile terminal test device which constitutes the mobile terminal testing system and is different from the first mobile terminal test device, the first mobile terminal testing device transmits the control signal to the mobile terminal according to a communication standard supported by the first mobile terminal testing device.

With this configuration, when receiving, from the second mobile terminal testing device which is another mobile terminal testing device, a control signal which is a control signal of a communication standard (first communication standard) that a base station simulated by the second mobile terminal testing device does not support transmission and of the first communication standard supported by a base station simulated by the first mobile terminal testing device, the control signal is transmitted according to a first communication standard supported by a base station simulated by the first mobile terminal testing device. Therefore, the processing load can be reduced.

In the mobile terminal testing device of a third aspect of the present invention according to the mobile terminal testing device of the first aspect, the communication standard supported by the second testing device may be a successor standard to the communication standard supported by the first mobile terminal testing device.

In the mobile terminal testing device of a fourth aspect of the present invention according to the mobile terminal testing device of the second aspect, the communication standard supported by the second testing device may be a successor standard to the communication standard supported by the first mobile terminal testing device.

In the mobile terminal testing device of a fifth aspect of the present invention according to the mobile terminal testing device of the first aspect, the communication standard supported by the second testing device may be 5G NR, and the communication standard supported by the first mobile terminal testing device may be LTE.

In the mobile terminal testing device of a sixth aspect of the present invention according to the mobile terminal testing device of the second aspect, the communication standard supported by the second testing device may be 5G NR, and the communication standard supported by the first mobile terminal testing device may be LTE.

A mobile terminal testing system of a seventh aspect of the present invention is a mobile terminal testing system including a first mobile terminal testing device and a second mobile terminal testing device, wherein the first mobile terminal testing device simulates base stations of mobile communication to test the mobile terminal, when a control signal of a communication standard not supported by the first mobile terminal testing device is received from the second mobile terminal test device which constitutes the mobile terminal testing system and is different from the first mobile terminal test device, the first mobile terminal testing device transmits the control signal to the mobile terminal according to a communication standard supported by the first mobile terminal testing device, the second mobile terminal testing device simulates base stations of mobile communication to test the mobile terminal, when a control signal of a communication standard not supported by the second mobile terminal testing device is transmitted to the mobile terminal by the first mobile terminal test device which constitutes the mobile terminal testing system and is different from the second mobile terminal test device, the second mobile terminal testing device generates the control signal and transmits the generated control signal to the first mobile terminal testing device, and the first mobile terminal testing device and the second mobile terminal testing device are configured to communicate with each other.

With this configuration, the first mobile terminal testing device and the second mobile terminal testing device are configured to be able to communicate with each other. Therefore, the processing load of the first mobile terminal testing device can be reduced.

In the mobile terminal testing system of an eighth aspect of the present invention according to the mobile terminal testing system of the seventh aspect, the second communication standard supported by the second testing device may be a successor standard to the first communication standard supported by the first mobile terminal testing device.

With this configuration, the first mobile terminal testing device that operates according to the first communication standard and the second mobile terminal testing device that operates according to the second communication standard that is the successor standard of the first communication standard are configured to be able to communicate with each other. Therefore, the processing load of the first mobile terminal testing device can be reduced.

In the mobile terminal testing system of a ninth aspect of the present invention according to the mobile terminal testing system of the seventh aspect, the communication standard supported by the second testing device may be 5G NR, and the communication standard supported by the first mobile terminal testing device may be LTE.

With this configuration, the first mobile terminal testing device that operates as a base station of LTE and the second mobile terminal testing device that operates as a base station of 5G NR are configured to be able to communicate with each other. Therefore, the processing load of the mobile terminal testing device that operates as a base station of LTE can be reduced.

A testing method for NSA of a tenth aspect of the present invention is a testing method for NSA using the mobile terminal testing system according to the eighth aspect, the method including when transmitting a control signal of the second communication standard to the mobile terminal, a step of generating the control signal of the second communication standard, by the second mobile terminal testing device operating as a base station of the second communication standard; a step of transmitting the generated control signal of the second communication standard to the first mobile terminal testing device operating as a base station of the first communication standard, by the second mobile terminal testing device; and a step of transmitting the received control signal of the second communication standard to the mobile terminal according to the first communication standard, by the first mobile terminal testing device.

With this configuration, when transmitting the control signal of the second communication standard to the mobile terminal, a control signal of the second communication standard is generated by the second mobile terminal testing device operating as a base station of the second communication standard, the generated control signal of the second communication standard is transmitted to the first mobile terminal testing device operating as a base station of the first communication standard, by the second mobile terminal testing device operating as a base station of the second communication standard, and the received control signal of the second communication standard is transmitted to the mobile terminal according to the first communication standard according to the LTE, by the first mobile terminal testing device that operates as a base station of the first communication standard. Therefore, the processing load of the first mobile terminal testing device that operates as a base station of the first communication standard can be reduced.

A testing method for NSA of an eleventh aspect of the present invention is a testing method for NSA using the mobile terminal testing system according to the ninth aspect, the method including when transmitting a control signal of the 5G NR to the mobile terminal, a step of generating the control signal of 5G NR, by the second mobile terminal testing device operating as a base station of the 5G NR; a step of transmitting the generated control signal of 5G NR to the first mobile terminal testing device operating as a base station of the LTE, by the second mobile terminal testing device; and a step of transmitting the received control signal of 5G NR to the mobile terminal according to the LTE, by the first mobile terminal testing device.

With this configuration, when transmitting the control signal of 5G NR to the mobile terminal, the control signal of 5G NR is generated by the second mobile terminal testing device operating as a base station of 5G NR, the generated control signal of 5G NR is transmitted to the first mobile terminal testing device operating as a base station of the LTE, by the second mobile terminal testing device operating as a base station of 5G NR, and the received control signal of 5G NR is transmitted to the mobile terminal according to the LTE, by the first mobile terminal testing device that operates as a base station of LTE. Therefore, the processing load of the first mobile terminal testing device that operates as a base station of LTE can be reduced.

Advantage of the Invention

According to the present invention, it is possible to provide a mobile terminal testing device capable of reducing a processing load, when testing a mobile terminal that supports NSA.

BEST MODE FOR CARRYING OUT THE INVENTION

Hereinafter, a mobile terminal testing system according to an embodiment of the present invention will be described in detail with reference to the drawings.

Figure 1:
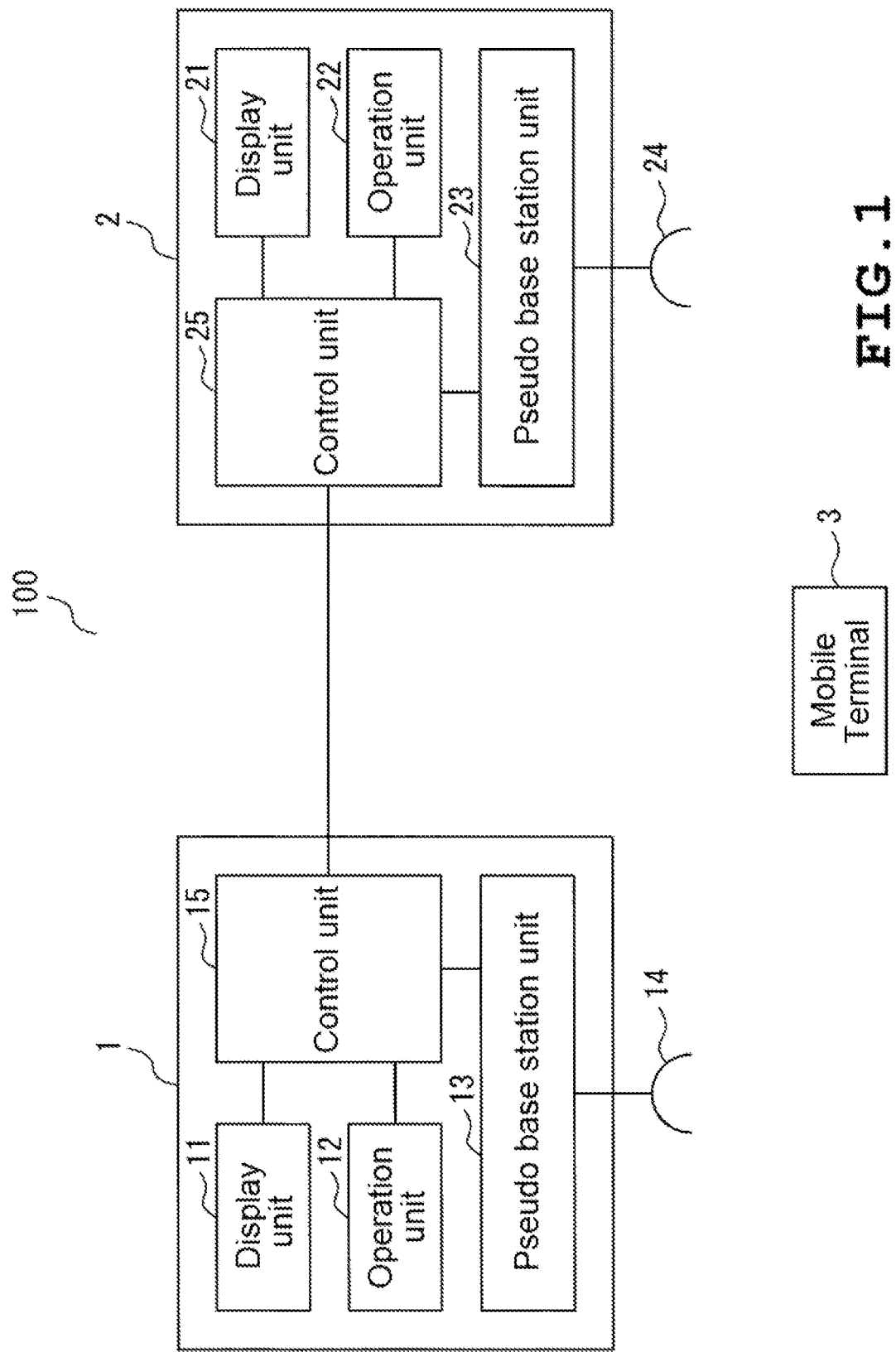
FIG. 1 is a block diagram of a mobile terminal testing system according to an embodiment of the present invention.

In FIG. 1, a mobile terminal testing system 100 according to an embodiment of the present invention includes a first mobile terminal testing device 1, and a second mobile terminal testing device 2.

The first mobile terminal testing device 1 and the second mobile terminal testing device 2 are communication testing devices of different standards. For example, the first mobile terminal testing device 1 is configured exclusively for the LTE standard, and the second mobile terminal testing device 2 is configured exclusively for the 5G NR standard.

The mobile terminal testing system 100 according to the present embodiment tests a mobile terminal 3 configured to perform communication of a plurality of standards such as 5G NR and LTE.

In the present embodiment, the first mobile terminal testing device 1 and the second mobile terminal testing device 2 transmit and receive signals to and from the mobile terminal 3 wirelessly through the antennas 14, 24.

The first mobile terminal testing device 1 is a computer unit including a central processing unit (CPU), a random access memory (RAM), a read only memory (ROM), a flash memory, a hard disk device, an input port, and an output port.

In this computer unit, the CPU executes an operating system (OS) stored in the hard disk device, so the CPU can control devices connected to the input port and the output port.

The first mobile terminal testing device 1 includes a display unit 11, an operation unit 12, a pseudo base station unit 13, an antenna 14, and a control unit 15.

The display unit 11 is an image display device such as a liquid crystal display, and displays an image for inputting necessary information and an image showing a state under test.

The operation unit 12 is input devices such as a keyboard, a mouse, and a touch panel, and outputs operation-input information to the control unit 15.

The pseudo base station unit 13 transmits and receives wireless signals to and from the mobile terminal 3 through the antenna 14, under the control of the control unit 15. The pseudo base station unit 13 controls the communication with the mobile terminal 3, based on the command input from the control unit 15. The pseudo base station unit 13 outputs the state of communication with the mobile terminal 3 to the control unit 15.

The pseudo base station unit 13 can perform LTE communication with the mobile terminal 3 according to the LTE standard.

The control unit 15 is configured by a program stored in the hard disk device of the first mobile terminal testing device 1. The control unit 15 operates on the OS of the first mobile terminal testing device 1, and controls the display unit 11, the operation unit 12, and the pseudo base station unit 13 through the OS to make the computer unit operate as the first mobile terminal testing device 1.

The control unit 15 controls the operation as a pseudo base station by outputting a command to the pseudo base station unit 13, based on the information input to the operation unit 12. The control unit 15 displays an input guide to the operation unit 12, the contents of parameters set in the pseudo base station unit 13, and a state of communication with the mobile terminal 3 output from the pseudo base station unit 13, on the display unit 11.

The first mobile terminal testing device 1 is a computer unit including a CPU, a RAM, a ROM, a flash memory, a hard disk device, an input port, and an output port.

In this computer unit, the CPU executes an operating system (OS) stored in the hard disk device, so the CPU can control devices connected to the input port and the output port.

The second mobile terminal testing device 2 includes a display unit 21, an operation unit 22, a pseudo base station unit 23, an antenna 24, and a control unit 25.

The display unit 21 is an image display device such as a liquid crystal display, and displays an image for inputting necessary information and an image showing a state under test.

The operation unit 22 is input devices such as a keyboard, a mouse, and a touch panel, and outputs operation-input information to the control unit 25.

The pseudo base station unit 23 transmits and receives wireless signals to and from the mobile terminal 3 through the antenna 24, under the control of the control unit 25. The pseudo base station unit 23 controls the communication with the mobile terminal 3, based on the command input from the control unit 25. The pseudo base station unit 23 outputs the state of communication with the mobile terminal 3 to the control unit 25.

The pseudo base station unit 23 can perform 5G NR communication with the mobile terminal 3 according to the 5G NR standard.

The control unit 25 is configured by a program stored in the hard disk device of the second mobile terminal testing device 2. The control unit 25 operates on the OS of the second mobile terminal testing device 2, and controls the display unit 21, the operation unit 22, and the pseudo base station unit 23 through the OS to make the computer unit operate as the second mobile terminal testing device 2.

Based on the information input to the operation unit 22, the control unit 25 outputs a command to the pseudo base station unit 23 and controls the operation as a pseudo base station. The control unit 25 displays an input guide to the operation unit 22, the contents of parameters set in the pseudo base station unit 23, and a state of communication with the mobile terminal 3 output from the pseudo base station unit 23, on the display unit 21.

The control unit 15 of the first mobile terminal testing device 1 and the control unit 25 of the second mobile terminal testing device 2 are connected with a cable and can communicate with each other.

In the mobile terminal testing system 100 having such a configuration, when testing the mobile terminal 3 that supports NSA, the first mobile terminal testing device 1 is made to create a test scenario in which parameters and signal sequences according to test items as an LTE pseudo base station are set.

In addition, the second mobile terminal testing device 2 is made to create a test scenario in which parameters and signal sequences according to the test items as a 5G NR pseudo base station are set. At this time, a control signal of 5G NR (hereinafter also referred to as a signaling message) transmitted on the LTE C-Plane is also set in the test scenario of the second mobile terminal testing device 2.

The test scenarios thus created are executed by the first mobile terminal testing device 1 and the second mobile terminal testing device 2.

When it is time for the second mobile terminal testing device 2 to transmit a control signal of 5G NR during execution of the test scenario, the control unit 25 of the second mobile terminal testing device 2 generates a signaling message based on the information set in the test scenario.

The control unit 25 notifies the control unit 15 of the first mobile terminal testing device 1 of the generated signaling message.

When the control unit 15 of the first mobile terminal testing device 1 receives the 5G NR signaling message from the control unit 25 of the second mobile terminal testing device 2, the control unit 15 transmits the received signaling message to the mobile terminal 3 on the LTE C-Plane according to the LTE standard.

In this way, in testing of the mobile terminal 3 that supports the NSA, when a 5G NR signaling message is to be transmitted, the second mobile terminal testing device 2 that supports the 5G NR standard creates a signaling message and notifies the first mobile terminal testing device 1 that supports the LTE standard of the signaling message, and the first mobile terminal testing device 1 transmits (transfers) the received signaling message as it is.

Therefore, it is not necessary for the first mobile terminal testing device 1 to generate a 5G NR signaling message, and the processing load can be reduced.

In addition, since the first mobile terminal testing device 1 only transmits the received 5G NR signaling message to the mobile terminal 3 as it is, even when there is a change in the 5G NR standard, it is not necessary for the first mobile terminal testing device 1 to make a change.

Figure 2:
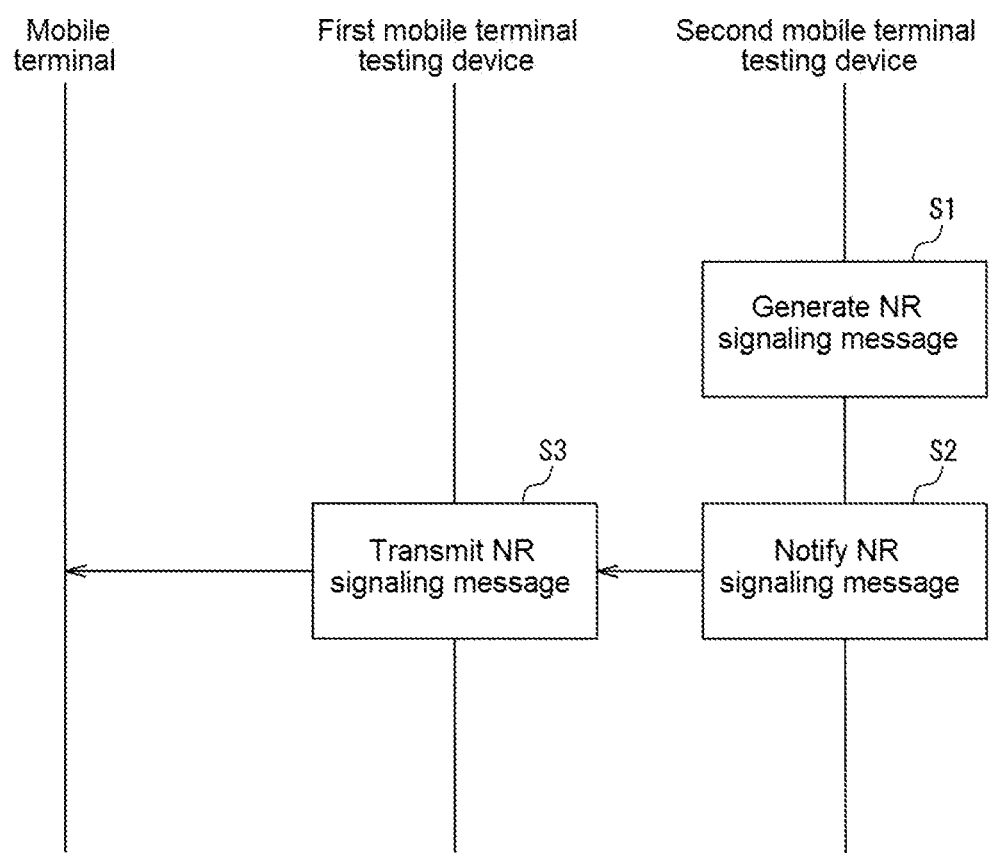
FIG. 2 is a sequence diagram illustrating the procedure of 5G NR signaling message transmission processing of the mobile terminal testing system according to the embodiment of the present invention.

A 5G NR signaling message transmission process by the mobile terminal testing system 100 according to the present embodiment configured as described above will be described with reference to FIG. 2.

When it is time to transmit a control signal of 5G NR, the control unit 25 of the second mobile terminal testing device 2 generates a signaling message based on the information set in the test scenario, in step S1.

In step S2, the control unit 25 notifies the control unit 15 of the first mobile terminal testing device 1 of the generated signaling message.

In step S3, the control unit 15 of the first mobile terminal testing device 1 transmits the received signaling message to the mobile terminal 3 using the LTE C-Plane.

In the present embodiment, the case where the first mobile terminal testing device 1 and the second mobile terminal testing device 2 each operate only with the device main body has been described. However, control may be performed from a personal computer device.

Although embodiments of the present invention have been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS 1 first mobile terminal testing device
2 second mobile terminal testing device
3 mobile terminal
15 control unit
25 control unit
100 mobile terminal testing system

What is claimed is:

1. A mobile testing system for testing a mobile terminal supporting non-standalone (NSA) according to a test scenario, comprising:
a second mobile terminal testing device simulating a second base station operating in a succeeding communication standard that succeeds a preceding communication standard, the second mobile terminal testing device comprising:
a second pseudo base station unit configured to simulate the second base station operating in the succeeding communication standard that succeeds the preceding communication standard, in communication with a first mobile terminal testing device simulating a first base station operating in the preceding communication standard through a cable,
a second display configured to display contents of parameters set in the second pseudo base station unit, and a state of a direct communication between the second mobile terminal testing device and the mobile terminal under test, the state outputted from the second pseudo base station unit, and
a second controller configured to:
create the test scenario in which parameters and signal sequences are set,
at a timing to transmit a control signaling message of the succeeding communication standard according to the test scenario, generate the control signaling message generated with the parameters and sequences according to the test scenario for the succeeding communication standard, and
transmit the generated control signaling message to the first mobile terminal testing device; and
the first mobile terminal testing device simulating the first base station operating in the preceding communication standard, the first mobile terminal testing device comprising:
a first pseudo base station unit configured to simulate the first base station operating in the preceding communication standard, in communication with the second mobile terminal testing device simulating the second base station operating in the succeeding communication standard through the cable,
a first controller configured to:
receive, from the second mobile terminal testing device, the control signaling message generated with parameters and sequences for the succeeding communication standard; and
transmit the control signaling message generated by the second controller with parameters and sequences according to the test scenario for the succeeding communication standard to the mobile terminal on a plane of the preceding communication standard, the plane being established directly between the first mobile terminal testing device and the mobile terminal.

2. The mobile testing system according to claim 1, wherein the succeeding communication standard supported by the second mobile terminal testing device is a successor standard to the preceding communication standard supported by the first mobile terminal testing device.

3. The mobile testing system according to claim 1, wherein the succeeding communication standard supported by the second mobile terminal testing device is 5G New Radio (NR), and the preceding communication standard supported by the first mobile terminal testing device is Long Term Evolution (LTE).

* * * * *